United States Patent
Kim et al.

(10) Patent No.: US 11,151,347 B1
(45) Date of Patent: Oct. 19, 2021

(54) TOUCH-FINGERPRINT COMPLEX SENSOR AND METHOD OF FABRICATING THE SAME

(71) Applicant: SAMSUNG ELECTRONICS CO., LTD., Suwon-si (KR)

(72) Inventors: Hongsuk Kim, Seoul (KR); Dongkyun Kim, Suwon-si (KR); Seogwoo Hong, Yongin-si (KR); Seokwhan Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 16/809,164

(22) Filed: Mar. 4, 2020

(30) Foreign Application Priority Data

Mar. 4, 2019 (KR) .................. 10-2019-0024854

(51) Int. Cl.
    *G06K 9/00* (2006.01)
(52) U.S. Cl.
    CPC ................. *G06K 9/00013* (2013.01)
(58) Field of Classification Search
    CPC .................................. G06K 9/00013
    See application file for complete search history.

(56) References Cited

U.S. PATENT DOCUMENTS

| 10,380,396 B2 | 8/2019 | Jung et al. |
| 10,481,741 B2 | 11/2019 | Han et al. |
| 2017/0059761 A1* | 3/2017 | Shim ............ H04N 13/31 |
| 2017/0123555 A1* | 5/2017 | Kim ............ G06K 9/00013 |
| 2017/0199420 A1* | 7/2017 | Shin ............ G02F 1/133504 |
| 2018/0035923 A1* | 2/2018 | Kang ............ A61B 5/117 |
| 2018/0060636 A1* | 3/2018 | Hong ............ G06K 9/00087 |
| 2019/0004663 A1* | 1/2019 | Li ............ G06F 3/0445 |
| 2019/0171306 A1* | 6/2019 | Kim ............ G06K 9/0002 |
| 2020/0004366 A1* | 1/2020 | Weng ............ G06F 3/047 |
| 2020/0327297 A1* | 10/2020 | An ............ G06F 3/0446 |

FOREIGN PATENT DOCUMENTS

| KR | 1020150120043 A | 10/2015 |
| KR | 101761547 B1 | 7/2017 |
| KR | 1020170136061 A | 12/2017 |
| KR | 1020180015371 A | 2/2018 |

* cited by examiner

*Primary Examiner* — Utpal D Shah

(74) *Attorney, Agent, or Firm* — Sughrue Mion, PLLC

(57) ABSTRACT

A touch-fingerprint complex sensor includes a fingerprint substrate provided in a fingerprint area and a touch area, common electrodes provided above the fingerprint substrate in a direction that is normal to an upper surface of the fingerprint substrate, fingerprint electrodes provided between the fingerprint substrate and the common electrodes in the direction, and touch electrodes provided below the common electrodes and the fingerprint substrate in the direction, wherein a first subset of the common electrodes, and the fingerprint electrodes are provided in the fingerprint area, and a second subset of the common electrodes, and the touch electrodes are provided in the touch area.

23 Claims, 11 Drawing Sheets

TOUCH-FINGERPRINT COMPLEX SENSOR AND METHOD OF FABRICATING THE SAME

CROSS-REFERENCE TO RELATED APPLICATION(S)

This application is based on and claims priority under 35 U.S.C. § 119 to Korean Patent Application No. 10-2019-0024854, filed on Mar. 4, 2019, in the Korean Intellectual Property Office, the disclosure of which is incorporated by reference herein in its entirety.

BACKGROUND

1. Field

The present disclosure relates to a touch-fingerprint complex sensor and a method of fabricating the same.

2. Description of Related Art

A touch screen is an input device that, when a user touches or presses a screen with a finger or the like, recognizes a position of the touch or press or related information and transmits the position or the related information to a system. A touch screen is simple and easy to use. In particular, a capacitive touch screen has advantages of high transmittance, good durability, excellent touch resolution, and multi-touch capability. A touch screen panel is applied not only to mobile devices such as smartphones and tablet personal computers (PCs), but also to a wide variety of electronic devices such as automated teller machines (ATMs), automatic ticketing machines, and navigation devices.

Recently, the need for personal authentication with respect to various mobile devices and electronic devices is gradually increasing. Personal authentication functions using personal characteristics such as a fingerprint characteristic, a voice characteristic, a facial characteristic, an iris characteristic, or the like, may have important uses in mobile devices, access control devices, financial devices, or the like. A fingerprint recognition technology of smartphones, tablet PCs, or the like, according to an existing method is a structure including a touch screen module in addition to a separate fingerprint recognition module.

SUMMARY

Provided is a touch-fingerprint complex sensor with improved performance.

Provided is a method of fabricating a touch-fingerprint complex sensor with improved performance.

Additional aspects will be set forth in part in the description which follows and, in part, will be apparent from the description, or may be learned by practice of the embodiments.

According to an aspect of an embodiment, a touch-fingerprint complex sensor may include aa fingerprint substrate provided in a fingerprint area and a touch area, common electrodes provided above the fingerprint substrate in a direction that is normal to an upper surface of the fingerprint substrate, fingerprint electrodes provided between the fingerprint substrate and the common electrodes in the direction, and touch electrodes provided below the common electrodes and the fingerprint substrate in the direction, wherein a first subset of the common electrodes, and the fingerprint electrodes are provided in the fingerprint area, and a second subset of the common electrodes, and the touch electrodes are provided in the touch area.

The fingerprint electrodes and the touch electrodes are non-overlapping in the direction.

The touch-fingerprint complex sensor may further include a fingerprint insulating layer provided between the common electrodes and the fingerprint substrate in the direction, wherein the fingerprint electrodes are provided between the fingerprint insulating layer and the fingerprint substrate in the direction.

The touch-fingerprint complex sensor may further include a touch substrate provided below the fingerprint substrate and the touch electrodes in the direction.

The touch substrate may be provided in the touch area and the fingerprint area.

The touch-fingerprint complex sensor may further include a touch insulating layer provided between the fingerprint substrate and the touch substrate in the direction, wherein the touch insulating layer overlaps the fingerprint electrodes in the direction.

The touch-fingerprint complex sensor may further include a bonding layer provided between the touch electrodes and the fingerprint substrate in the direction.

The common electrodes extend in a first direction parallel to the upper surface of the fingerprint substrate, and the fingerprint electrodes and the touch electrodes extend in a second direction intersecting the first direction.

According to another aspect of an embodiment, a method of fabricating a touch-fingerprint complex sensor may include forming an upper layer by forming common electrodes on a fingerprint substrate, and by forming fingerprint electrodes between the common electrodes and the fingerprint substrate. forming a lower layer that comprises touch electrodes, and bonding the upper layer with the lower layer.

The forming of the upper layer further comprises forming an insulating layer between the common electrodes and the fingerprint substrate, and wherein the fingerprint electrodes are disposed between the insulating layer and the fingerprint substrate.

The forming of the insulating layer further comprises coating the fingerprint substrate with an insulating material to cover the fingerprint electrodes.

The forming of the common electrodes may include forming a first metal layer on the insulating layer, and patterning the first metal layer to expose an upper surface of the insulating layer.

The lower layer may further include a touch substrate, and the touch electrodes are formed on the touch substrate.

The forming of the touch electrodes may include forming a second metal layer on the touch substrate, and patterning the second metal layer to expose an upper surface of the touch substrate.

The bonding of the upper layer with the lower layer may include bringing an upper surface of the lower layer into contact with a bottom surface of the upper layer, and heat-treating the lower layer and the upper layer.

The bonding of the upper layer with the lower layer may include forming a bonding layer between the lower layer and the upper layer, and hardening the bonding layer.

According to another aspect of an embodiment, a touch-fingerprint complex sensor may include a substrate, touch electrodes provided on the substrate, fingerprint electrodes provided on the touch electrodes, common electrodes provided on the fingerprint electrodes, a spacer provided between the touch electrodes and the fingerprint electrodes, and a fingerprint insulating layer provided between the spacer and the common electrodes, wherein the fingerprint electrodes are disposed between the fingerprint insulating layer and the spacer.

The fingerprint electrodes and the touch electrodes are non-overlapping in a direction that is normal to an upper surface of the substrate.

A first distance between the touch electrodes and the common electrodes is greater than a second distance between the fingerprint electrodes and the common electrodes, and wherein a difference between the first distance and the second distance corresponds to a thickness of the spacer.

The touch-fingerprint complex sensor may further include a touch insulating layer provided between the substrate and the spacer, wherein the touch insulating layer overlaps the fingerprint electrodes in a direction that is normal to an upper surface of the substrate.

BRIEF DESCRIPTION OF THE DRAWINGS

The above and/or other aspects, features, and advantages of certain embodiments of the present disclosure will be more apparent and more readily appreciated from the following description of the embodiments, taken in conjunction with the accompanying drawings, in which.

DETAILED DESCRIPTION

Figure 1:
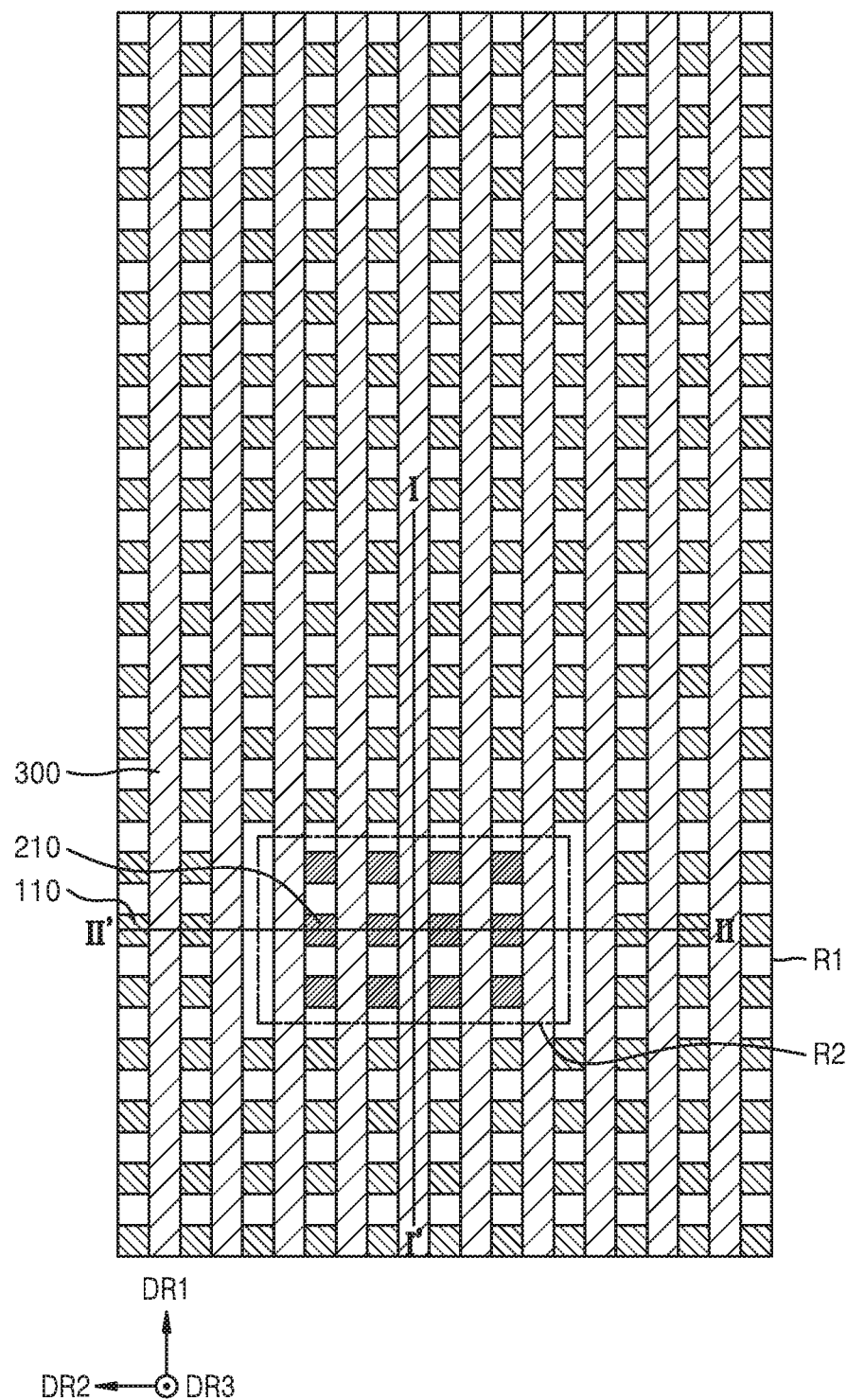
FIG. 1 is a plan view of a touch-fingerprint complex sensor according to an embodiment.

Reference will now be made in detail to embodiments of the disclosure, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain various aspects of the disclosure. As used herein, the term "and/or" includes any and all combinations of one or more of the associated listed items. Expressions such as "at least one of," when preceding a list of elements, modify the entire list of elements and do not modify the individual elements of the list.

In the case where a positional relationship between two items is described with terms such as "on," "on the top of," or the like, the items may be directly in contact, or may also be indirectly in contact.

As used herein, the singular forms "a," "an," and "the" are intended to include the plural forms as well, unless the context clearly indicates otherwise. Throughout the specification, when a portion "includes" an element, another element may be further included, rather than excluding the existence of the other element, unless otherwise described.

Also, the terms, such as "unit," "module," or the like, should be understood as a unit, a module, or the like, that processes at least one function or operation and that may be embodied in hardware, firmware, software, or a combination of hardware and software.

Figure 2A:
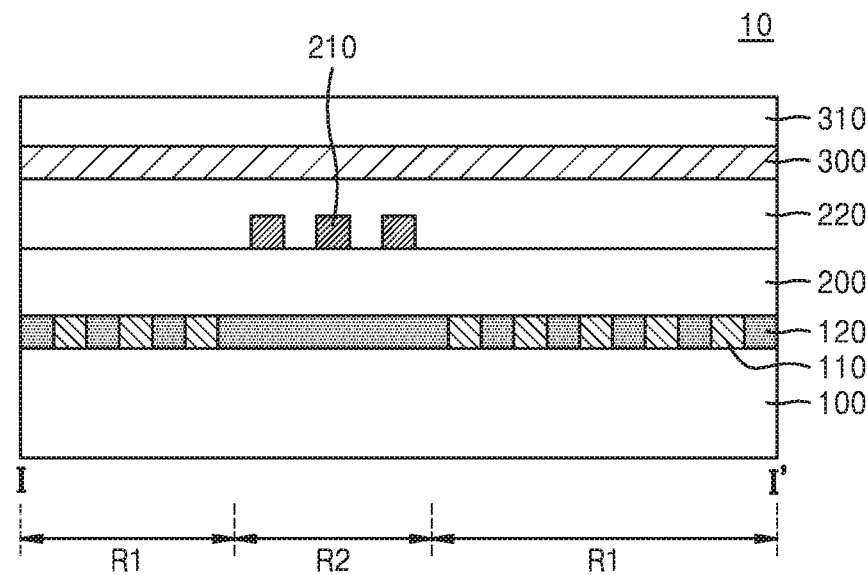
FIG. 2A is a cross-sectional view taken along line I-I' in FIG. 1.
Figure 2A:
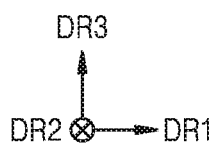
Figure 2B:
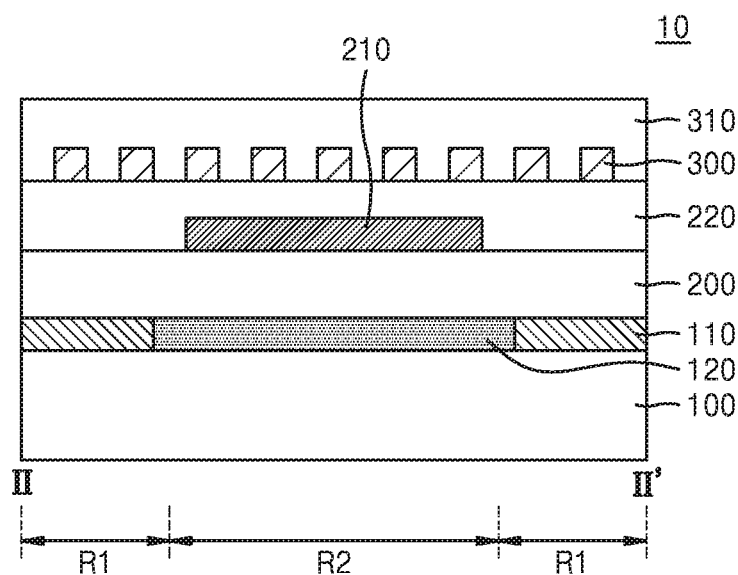
FIG. 2B is a cross-sectional view taken along line II-II' in FIG. 1.
Figure 2B:
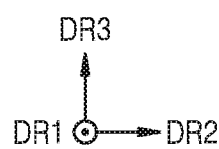

FIG. 1 is a plan view of a touch-fingerprint complex sensor 10 according to an embodiment. FIG. 2A is a cross-sectional view taken along a line I-I' in FIG. 1. FIG. 2B is a cross-sectional view taken along a line II-II' in FIG. 1.

Referring to FIGS. 1, 2A, and 2B, the touch-fingerprint complex sensor 10 may include a touch substrate 100, touch electrodes 110, a touch insulating layer 120, a fingerprint substrate 200, fingerprint electrodes 210, a fingerprint insulating layer 220, common electrodes 300, and a passivation film 310. The touch-fingerprint complex sensor 10 may include a touch area R1 and a fingerprint area R2. For example, the touch area R1 may surround the fingerprint area R2. The touch-fingerprint complex sensor 10 may sense a touch of a user (not shown) of the touch-fingerprint complex sensor 10 in the touch area R1. The touch-fingerprint complex sensor 10 may sense a fingerprint and a touch of a user of the touch-fingerprint complex sensor 10 in the fingerprint area R2.

The touch substrate 100 may extend in a first direction DR1 and may cross the touch area R1 and the fingerprint area R2. The touch substrate 100 may include a transparent insulating material. For example, the touch substrate 100 may include polyethylene terephthalate (PET), polycarbonate (PC), poly(methyl methacrylate) (PMMA), polyethylene naphthalate (PEN), polyethersulfone (PES), cyclic olefin copolymer (COC), triacetyl cellulose (TAC) film, polyvinyl alcohol (PVA) film, polyamide (PI) film, polystyrene (PS), biaxially oriented polystyrene (BOPS) containing styrene butadiene copolymer (SBC) (e.g., K-resin), glass, or the like.

The touch electrodes 110 may be provided on the touch substrate 100. The touch electrodes 110 may be provided in the touch area R1. The touch electrodes 110 may be disposed apart from the fingerprint area R2 in a non-overlapping manner. That is, the touch electrodes 110 may not be provided in the fingerprint area R2, and may not overlap the fingerprint electrodes 210 in a third direction DR3. The third direction DR3 may be a direction that is normal to an upper surface of the touch substrate 100. The touch electrodes 110 may extend in a second direction DR2 parallel to an upper surface of the touch substrate 100. The second direction DR2 may intersect the first direction DR1. The touch electrodes 110 may be arranged in the first direction DR1. The touch electrodes 110 may be arranged parallel to each other. The touch electrodes 110 may be transmitting electrodes of a touch sensor, or receiving electrodes of a touch sensor. The touch electrodes 110 may include a conductive material. For example, the touch electrodes 110 may include a metal (for example, gold (Au), tungsten (W), or copper (Cu)) or a transparent conductive oxide (for example, indium tin oxide (ITO), indium zinc oxide (IZO), indium zinc tin oxide (IZTO), or the like). When the touch electrodes 110 include a metal, the touch electrodes 110 may have a small width. A user of the touch-fingerprint complex sensor 10 may not recognize the touch electrodes 110. When the touch-fingerprint complex sensor 10 is arranged on a display panel (not shown), the visibility of the display panel may not be reduced.

The touch insulating layer 120 may be provided on the touch substrate 100. The touch insulating layer 120 may expose an upper surface of the touch electrodes 110. In other words, an upper surface of the touch insulating layer 120 may be arranged at a same level or a lower level with respect to the upper surface of the touch electrodes 110. The touch insulating layer 120 may include a transparent insulating material.

The fingerprint substrate 200 may be provided on the touch electrodes 110. The fingerprint substrate 200 may cross the touch area R1 and the fingerprint area R2. The fingerprint substrate 200 may be parallel to the touch substrate 100. The fingerprint substrate 200 may overlap the touch substrate 100 in a third direction DR3 that is perpendicular to the upper surface of the touch substrate 100. The fingerprint substrate 200 may be transparent. The fingerprint substrate 200 may include an insulating material. For example, the fingerprint substrate 200 may include PET, PC, PMMA, PEN, PES, COC, TAC film, PVA film, PI film, PS, BOPS containing SBC (e.g., K-resin), glass, or the like.

The fingerprint electrodes 210 may be provided on the fingerprint substrate 200. A thickness of the fingerprint substrate 200 may be determined as needed. The fingerprint electrodes 210 may be provided in the fingerprint area R2. The fingerprint electrodes 210 may extend in the second direction DR2. The fingerprint electrodes 210 may be arranged in the first direction DR1. The fingerprint electrodes 210 may be arranged parallel to each other. In a plan view, the fingerprint electrodes 210 may be disposed apart from the touch electrodes 110. In other words, the fingerprint electrodes 210 may not overlap the touch electrodes 110 in the third direction DR3. The fingerprint electrodes 210 may be transmitting electrodes of a fingerprint sensor, or receiving electrodes of a fingerprint sensor. The fingerprint electrodes 210 may include a conductive material. For example, the fingerprint electrodes 210 may include a metal (for example, Au, W, or Cu) or a transparent conductive oxide (for example, ITO, IZO, or IZTO). When the fingerprint electrodes 210 include a metal, the fingerprint electrodes 210 may have a small width. A user of the touch-fingerprint complex sensor 10 may not recognize the fingerprint electrodes 210. When the touch-fingerprint complex sensor 10 is arranged on a display panel (not shown), the visibility of the display panel may not be reduced.

The fingerprint insulating layer 220 may be provided on the fingerprint substrate 200. The fingerprint insulating layer 220 may extend on the fingerprint substrate 200 and cover the fingerprint electrodes 210. In other words, the fingerprint electrodes 210 may be arranged between the fingerprint insulating layer 220 and the fingerprint substrate 200. The fingerprint insulating layer 220 may include a transparent insulating material.

The common electrodes 300 may be provided on the fingerprint insulating layer 220. The common electrodes 300 may be disposed apart from the fingerprint electrodes 210 with the fingerprint insulating layer 220 placed therebetween. The common electrodes 300 may cross the touch area R1 and the fingerprint area R2. Accordingly, a first subset of the common electrodes 300 may be disposed in the touch area R1, and a second subset of the common electrodes 300 may be disposed in the fingerprint area R2. The common electrodes 300 may extend in the first direction DR1. The common electrodes 300 may be arranged in the second direction DR2. The common electrodes 300 may be arranged parallel to each other. In a plan view, the common electrodes 300 may intersect the fingerprint electrodes 210 and the touch electrodes 110. The common electrodes 300 may overlap the fingerprint electrodes 210 and the touch electrodes 110 in the third direction DR3. Further, the common electrodes 300 may be disposed above the touch electrodes 110 and the fingerprint electrodes 210 in the third direction DR3 that is normal to the upper surface of the touch substrate 100 and the upper surface of the fingerprint substrate 200. The common electrodes 300 may include a conductive material. For example, the common electrodes 300 may include a metal (for example, Au, W, or Cu) or a transparent conductive oxide (for example, ITO, IZO, or IZTO). When the common electrodes 300 include a metal, the common electrodes 300 may have a small width. A user of the touch-fingerprint complex sensor 10 may not recognize the common electrodes 300. When the touch-fingerprint complex sensor 10 is arranged on a display panel (not shown), the visibility of the display panel may not be reduced.

The common electrodes 300 in the touch area R1 may be transmitting electrodes of a touch sensor, or receiving electrodes of a touch sensor. For example, when the touch electrodes 110 are receiving electrodes of a touch sensor, the common electrodes 300 in the touch area R1 may be transmitting electrodes of a touch sensor.

The common electrodes 300 in the fingerprint area R2 may be transmitting electrodes of a fingerprint sensor, or receiving electrodes of a fingerprint sensor. For example, when the fingerprint electrodes 210 are receiving electrodes of a fingerprint sensor, the common electrodes 300 in the fingerprint area R2 may be transmitting electrodes of a fingerprint sensor.

The passivation film 310 may be provided on the common electrodes 300. The passivation film 310 may protect layers arranged under the passivation film 310. The passivation film 310 may include a transparent insulating material.

A capacitance between a common electrode 300 and a touch electrode 110 adjacent to each other in the touch area R1 may be referred to as a first mutual capacitance. When a user of the touch-fingerprint complex sensor 10 touches, with a finger, an upper surface of the passivation film 310 in the touch area R1, the first mutual capacitance may be reduced. The touch-fingerprint complex sensor 10 may recognize a touch of the user by using an amount of change of the first mutual capacitance.

In an embodiment, a low first mutual capacitance may be preferred. When the first mutual capacitance is low, a touch recognition operation speed may be fast and a resistance of the touch electrodes 110 may be low. When the resistance of the touch electrodes 110 is low, a touch sensor having an improved performance may be provided in a large area. As a distance between the common electrode 300 and the touch electrode 110 increases, the first mutual capacitance may decrease. In the present disclosure, a distance between the common electrode 300 and the touch electrode 110 may be adjusted by using the touch substrate 100. That is, the fingerprint substrate 200 may be a spacer that adjusts a gap between the common electrode 300 and the touch electrode 110. A thickness of the fingerprint substrate 200 may be determined and set such that the first mutual capacitance may have a particular value.

A capacitance between a common electrode 300 and a fingerprint electrode 210 that are adjacent to each other in the fingerprint area R2 may be referred to as a second mutual capacitance. When a user of the touch-fingerprint complex sensor 10 touches, with a finger, an upper surface of the passivation film 310 in the fingerprint area R2, the second mutual capacitance may be reduced. The touch-fingerprint complex sensor 10 may recognize a fingerprint of the user by using an amount of change of the second mutual capacitance.

In an example, a high second mutual capacitance may be preferred. When the second mutual capacitance is high, a difference between a second mutual capacitance with respect to a valley of a fingerprint and a second mutual capacitance with respect to a ridge of a fingerprint may be large. Accordingly, a fingerprint recognition function of the touch-fingerprint complex sensor 10 may be improved. As a distance between the common electrode 300 and the fingerprint electrode 210 decreases, the second mutual capacitance may increase. The distance between the common electrodes 300 and the fingerprint electrodes 210 may be less than a thickness of the fingerprint insulating layer 220. For example, the distance between the common electrodes 300 and the fingerprint electrodes 210 may be less than 8 micrometers (μm).

The present disclosure may provide a low capacitance between the common electrodes 300 and the touch electrodes 110, and may provide a high capacitance between the common electrodes 300 and the fingerprint electrodes 210. Accordingly, the touch recognition operation speed and the fingerprint recognition performance of the touch-fingerprint complex sensor 10 may be improved, and the touch electrodes 110 may have a low resistance.

Figure 3:
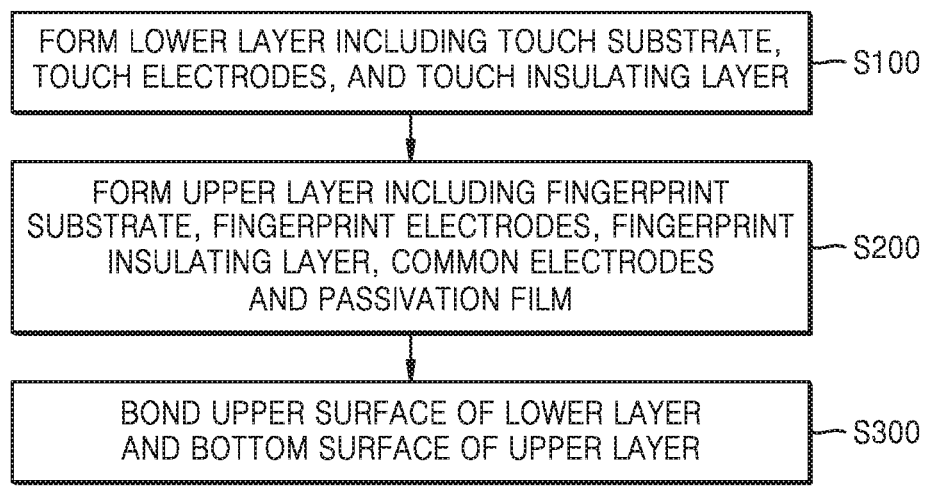
FIG. 3 is a flowchart illustrating a method of fabricating a touch-fingerprint complex sensor according to an embodiment.

FIG. 3 is a flowchart illustrating a method of fabricating a touch-fingerprint complex sensor according to an embodiment. FIGS. 4A, 5A, 6A, and 7A are cross-sectional views corresponding to the line I-I' in FIG. 1 to explain the method of fabricating the touch-fingerprint complex sensor in FIG. 3. FIGS. 4B, 5B, 6B, and 7B are cross-sectional views corresponding to the line II-II' in FIG. 1 to explain the method of fabricating the touch-fingerprint complex sensor in FIG. 3. For brevity of explanation, contents which are substantially the same as those described with reference to FIGS. 1, 2A, and 2B may be omitted.

Figure 4A:
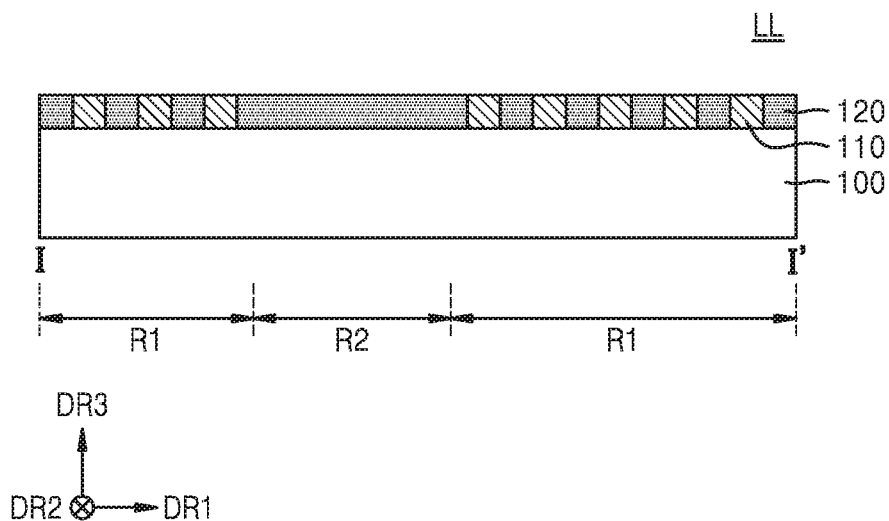
FIG. 4A is a cross-sectional view corresponding to line I-I' in FIG. 1 to explain the method of fabricating the touch-fingerprint complex sensor in FIG. 3.
Figure 4B:
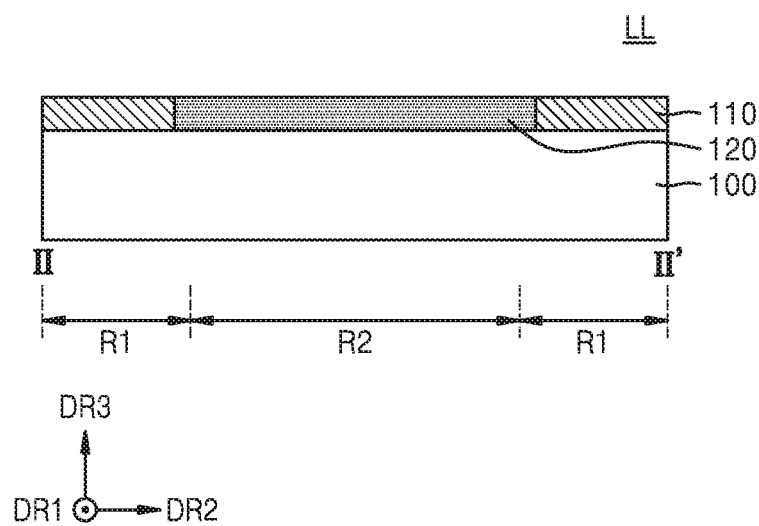
FIG. 4B is a cross-sectional view corresponding to line II-II' in FIG. 1 to explain the method of fabricating the touch-fingerprint complex sensor in FIG. 3.
Figure 5A:
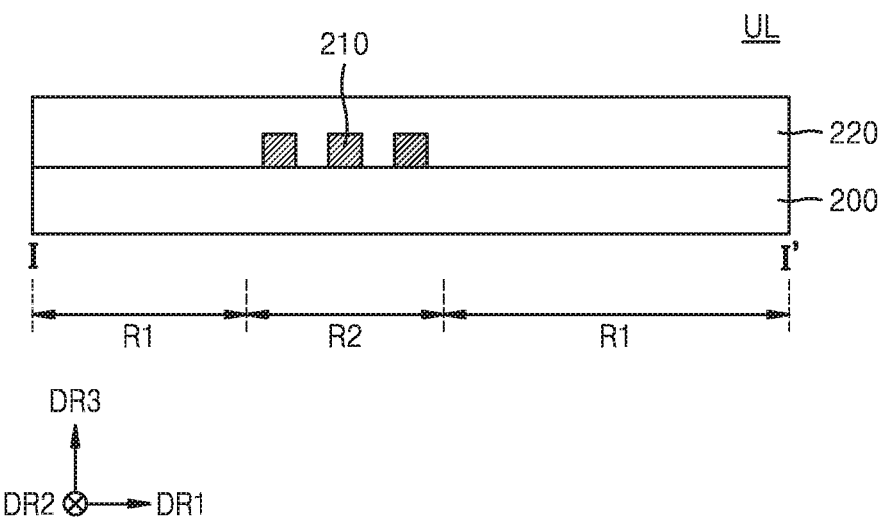
FIG. 5A is a cross-sectional view corresponding to line I-I' in FIG. 1 to explain the method of fabricating the touch-fingerprint complex sensor in FIG. 3.
Figure 5B:
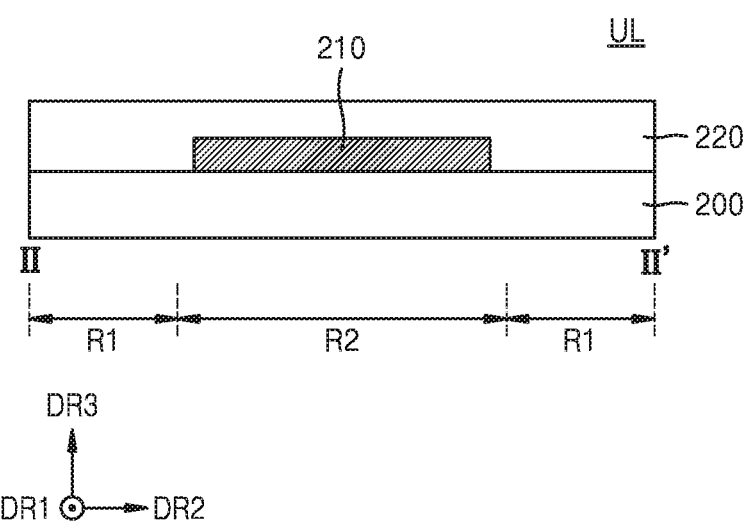
FIG. 5B is a cross-sectional view corresponding to line II-II' in FIG. 1 to explain the method of fabricating the touch-fingerprint complex sensor in FIG. 3.
Figure 6A:
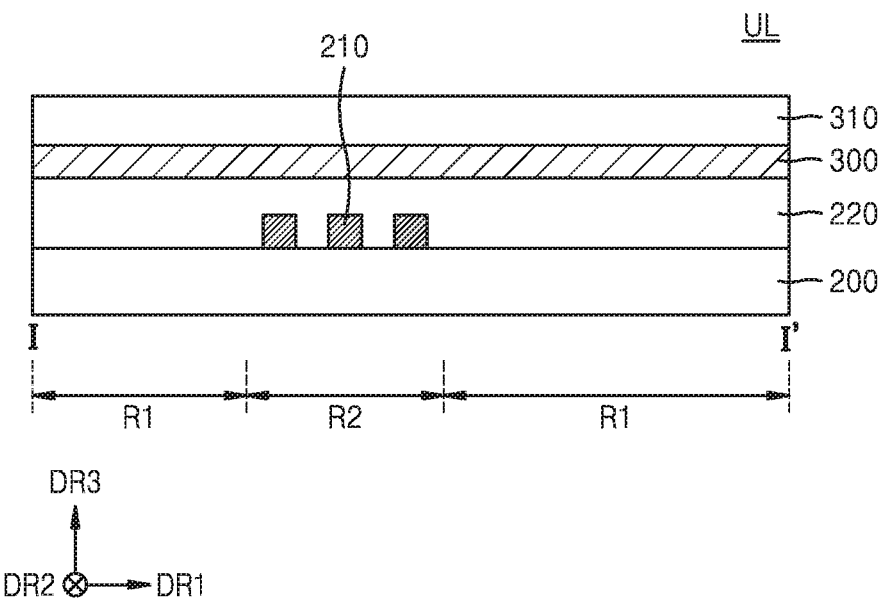
FIG. 6A is a cross-sectional view corresponding to line I-I' in FIG. 1 to explain the method of fabricating the touch-fingerprint complex sensor in FIG. 3.
Figure 6B:
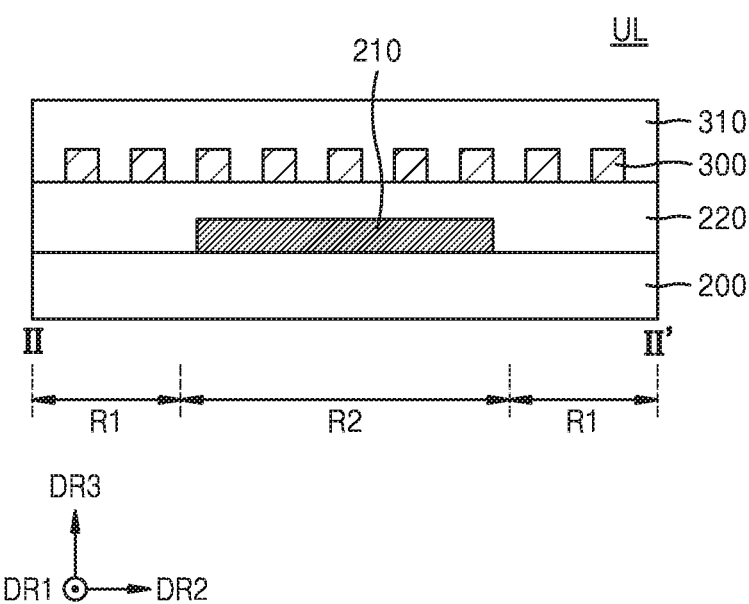
FIG. 6B is a cross-sectional view corresponding to line II-II' in FIG. 1 to explain the method of fabricating the touch-fingerprint complex sensor in FIG. 3.

Referring to FIGS. 3, 4A, and 4B, a lower layer LL including the touch substrate 100, the touch electrodes 110, and the touch insulating layer 120 may be formed at operation S100. A forming of the touch electrodes 110 may include a forming of a conductive material layer (not shown) on the touch substrate 100, and a patterning of the conductive material layer. The conductive material layer may be formed by a coating process or a deposition process. For example, the conductive material layer may include a metal (for example, Au, W, or Cu) or a transparent conductive oxide (for example, ITO, IZO, or IZTO). The patterning of the conductive material layer may include an etching of the conductive material layer by using an etching mask (not shown). The etching of the conductive material layer may be performed until the upper surface of the touch substrate 100 is exposed.

A forming of the touch insulating layer 120 may include a forming of an insulating material layer (not shown) covering the touch electrodes 110 on the touch substrate 100, and an etching of the insulating material layer to a larger area. The insulating material layer may be formed by a coating process. For example, the coating process may include a spin coating process or a slot-die coating process. The etching of the insulating material layer may be performed unit the touch electrodes 110 are exposed. The insulating material layer may include a transparent insulating material.

Referring to FIGS. 3, 5A, 5B, 6A, and 6B, an upper layer UL including the fingerprint substrate 200, the fingerprint electrodes 210, the fingerprint insulating layer 220, the common electrodes 300, and the passivation film 310 may be formed at operation S200. A forming of the fingerprint electrodes 210 may include a forming of the conductive material layer (not shown) on the fingerprint substrate 200, and a patterning of the conductive material layer. The conductive material layer may include a metal (for example, Au, W, or Cu) or a transparent conductive oxide (for example, ITO, IZO, or IZTO). The patterning of the conductive material layer may include an etching of the conductive material layer by using an etching mask (not shown). The etching of the conductive material layer may be performed until an upper surface of the fingerprint substrate 200 is exposed.

The forming of the fingerprint insulating layer 220 may include a forming of an insulating material layer (not shown) covering the fingerprint electrodes 210 on the fingerprint substrate 200. The insulating material layer may be formed by a coating process. For example, the coating process may include a spin coating process or a slot-die coating process. The insulating material layer may include a transparent insulating material.

The forming of the common electrodes 300 may include a forming of conductive material layer (not shown) on the fingerprint insulating layer 220, and a patterning of the conductive material layer. The conductive material layer may include a metal (for example, Au, W, or Cu) or a transparent conductive oxide (for example, ITO, IZO, or IZTO). The patterning of the conductive material layer may include an etching of the conductive material layer by using an etching mask (not shown). The etching of the conductive material layer may be performed until an upper surface of the fingerprint insulating layer 220 is exposed.

A forming of the passivation film 310 may include a forming of an insulating material layer covering the common electrodes 300 on the fingerprint insulating layer 220. The insulating material layer may be formed by a deposition process. The insulating material layer may include a transparent insulating material.

Figure 7A:
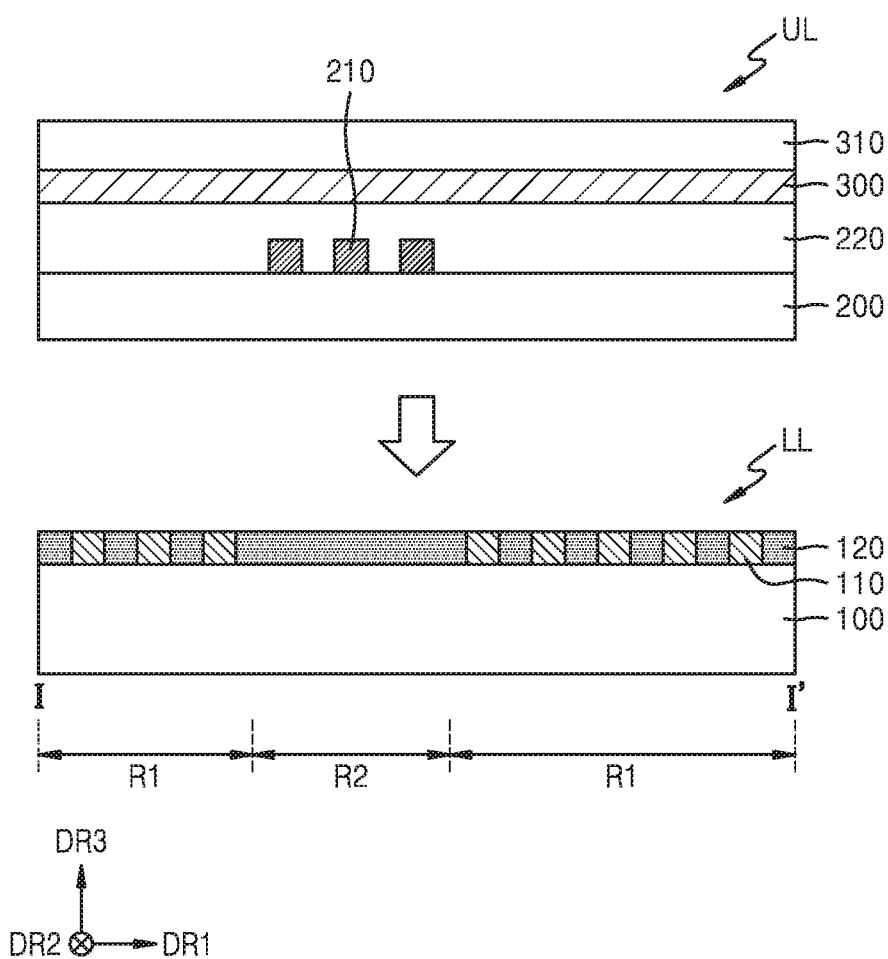
FIG. 7A is a cross-sectional view corresponding to line I-I' in FIG. 1 to explain the method of fabricating the touch-fingerprint complex sensor in FIG. 3.
Figure 7B:
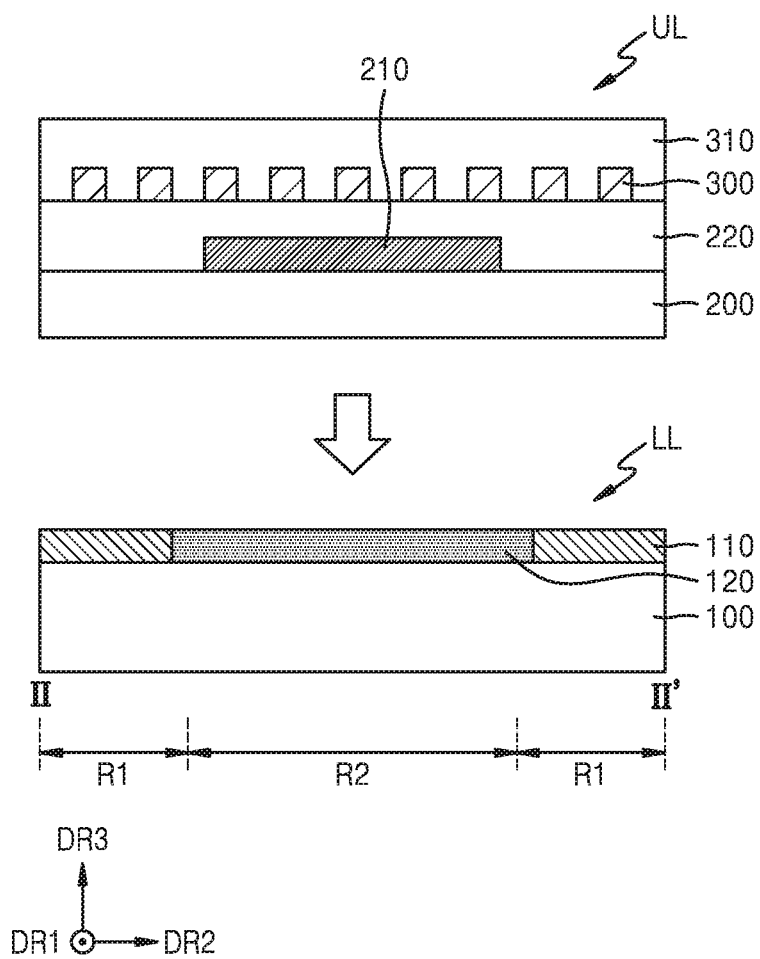
FIG. 7B is a cross-sectional view corresponding to line II-II' in FIG. 1 to explain the method of fabricating the touch-fingerprint complex sensor in FIG. 3.

Referring to FIGS. 3, 7A, and 7B, an upper surface of the lower layer LL and a bottom surface of the upper layer UL may be bonded at operation S300. The upper surface of the lower layer LL may be the upper surface of the touch insulating layer 120 and the upper surface of the touch electrodes 110. The bottom surface of the upper layer UL may be a bottom surface of the fingerprint substrate 200. The bonding process may include a process of bringing the upper surface of the lower layer LL into contact with the bottom surface of the upper layer UL, and a process of heat-treating the lower layer LL and the upper layer UL. The process of bring the upper surface of the lower layer LL into contact with the bottom surface of the upper layer UL may be performed such that the touch electrodes 110 and the fingerprint electrodes 210 do not vertically overlap each other in the third direction DR3. Accordingly, referring to FIGS. 1, 2A, and 2B, the described touch-fingerprint complex sensor 10 may be provided.

Figure 8A:
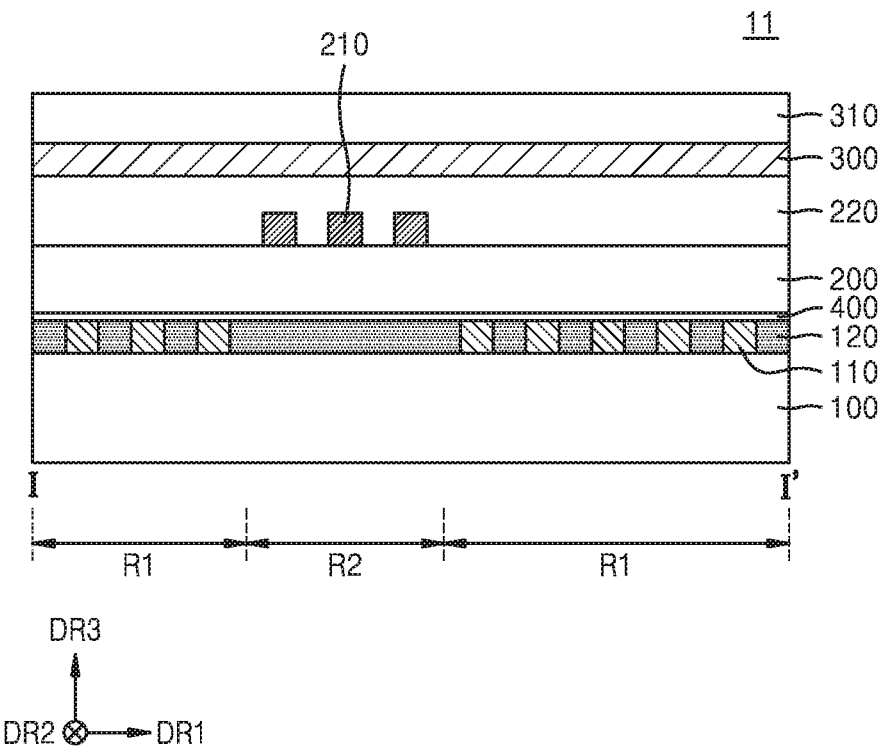
FIG. 8A is a cross-sectional view corresponding to line I-I' in FIG. 1 of a touch-fingerprint complex sensor according to an embodiment.
Figure 8B:
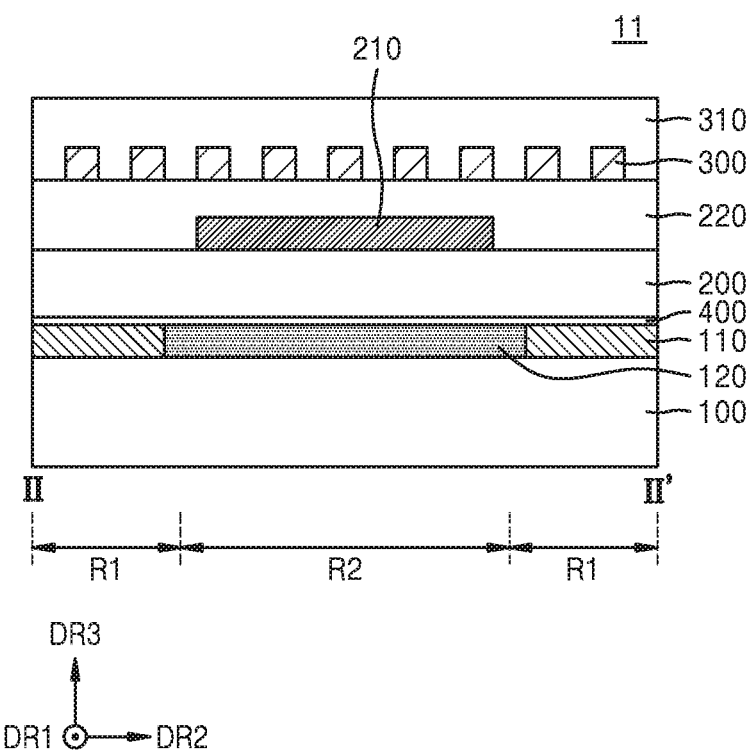
FIG. 8B is a cross-sectional view corresponding to line II-II' in FIG. 1 of a touch-fingerprint complex sensor according to an embodiment.

FIG. 8A is a cross-sectional view corresponding to the line I-I' in FIG. 1 of a touch-fingerprint complex sensor according to an embodiment. FIG. 8B is a cross-sectional view corresponding to the line II-II' in FIG. 1 of a touch-fingerprint complex sensor according to an embodiment. For brevity of explanation, contents which are substantially the same as those described above with reference to FIGS. 1, 2A, and 2B may be omitted.

Referring to FIGS. 8A and 8B, a touch-fingerprint complex sensor 11 may include the touch substrate 100, the touch electrodes 110, the touch insulating layer 120, a bonding layer 400, the fingerprint substrate 200, the fingerprint electrodes 210, the fingerprint insulating layer 220, the common electrodes 300, and the passivation film 310.

As compared to the touch-fingerprint complex sensor shown in FIGS. 2A and 2B, the touch-fingerprint complex sensor 11 may further include the bonding layer 400. The bonding layer 400 may be positioned between the touch insulating layer 120 and the fingerprint substrate 200. The bonding layer 400 may bond the upper layer UL described with reference to FIGS. 6A and 6B with the lower layer LL described with reference to FIGS. 4A and 4B. For example, the bonding process may include an operation of coating the bonding layer 400 on the lower layer LL, and an operation of hardening the bonding layer 400 after bringing the bonding layer 400 and the upper layer UL into contact with each other. For example, the bonding layer 400 may include an optical clear adhesive (OCA) or an optical clear resin (OCR).

Figure 9:
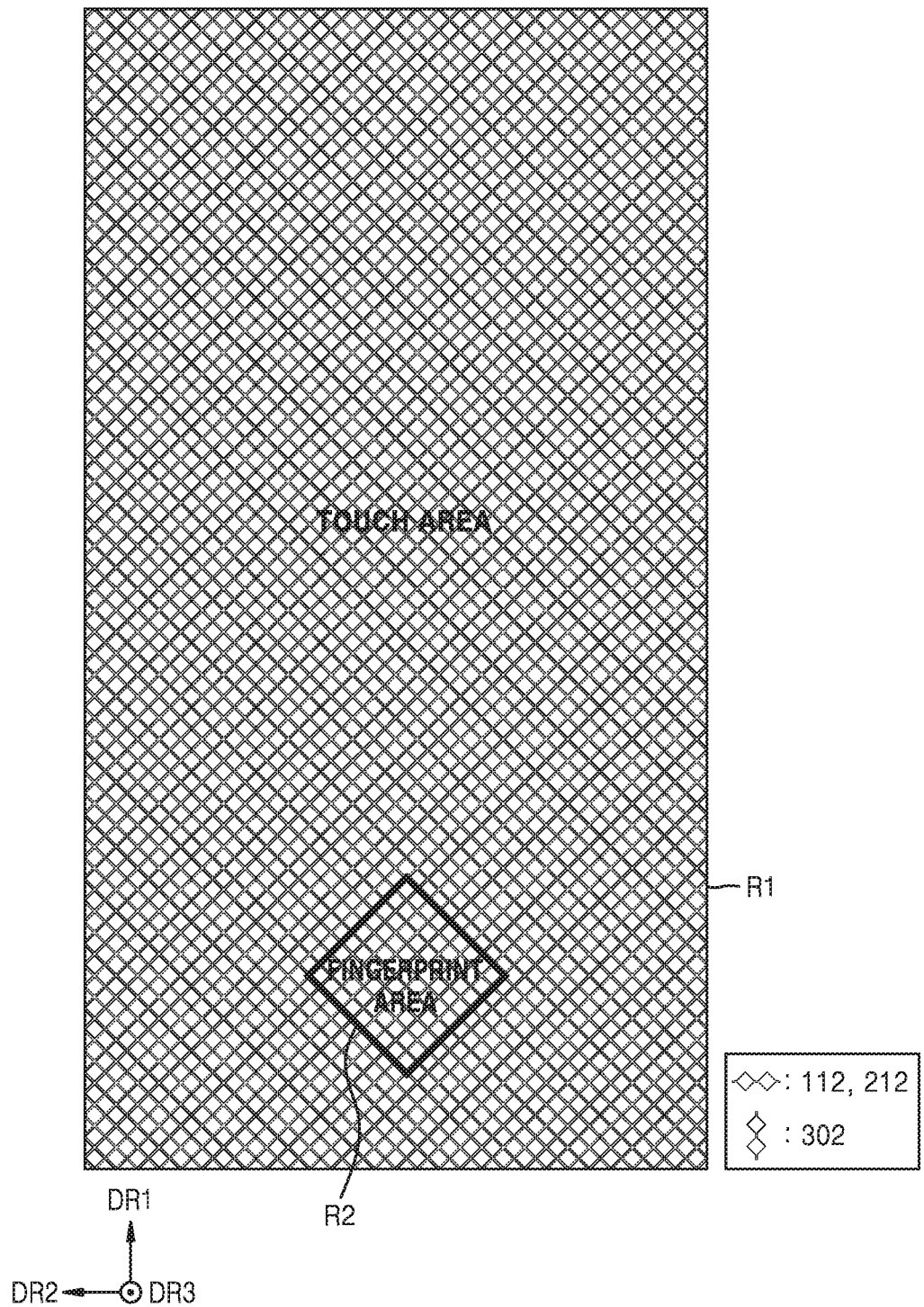
FIG. 9 is a plan view of a touch-fingerprint complex sensor according to an embodiment.

FIG. 9 is a plan view of a touch-fingerprint complex sensor 12 according to an example embodiment. For brevity of explanation, contents which are substantially same as those described with reference to FIGS. 1, 2A, and 2B may not be described.

Referring to FIG. 9, the touch-fingerprint complex sensor 12 may include a touch area R1 and a fingerprint area R2. For example, the touch area R1 may surround the fingerprint area R2. The touch-fingerprint complex sensor 12 may sense a touch of a user (not shown) of the touch-fingerprint complex sensor 12 in the touch area R1. The touch-fingerprint complex sensor 12 may sense a fingerprint and a touch of a user of the touch-fingerprint complex sensor 12 in the fingerprint area R2.

The touch-fingerprint complex sensor 12 may include touch electrodes 112, fingerprint electrodes 212, and common electrodes 302. Apart from their shapes, the touch electrodes 112, the fingerprint electrodes 212, and the common electrodes 302 may be substantially the same as the touch electrodes 110, the fingerprint electrodes 210, and the common electrodes 300 described above with reference to FIG. 1. The touch electrodes 112 may be provided in the touch area R1. The touch electrodes 112 may extend in the second direction DR2. As compared to the touch electrodes 110 described above with reference to FIG. 1, a width of each of the touch electrodes 112 may not be uniform. The touch electrodes 112 may have a relatively large width between the common electrodes 302, and the touch electrodes 112 may have a relatively small width at a portion intersecting the common electrodes 302. For example, the touch electrodes 112 may have a diamond shape between the common electrodes 302. Accordingly, the touch electrodes 112 may have a low resistance.

The fingerprint electrodes 212 may be provided in the fingerprint area R2. The fingerprint electrodes 212 may extend in the second direction DR2. As compared to the fingerprint electrodes 210 described above with reference to FIG. 1, a width of each of the fingerprint electrodes 212 may not be uniform. The fingerprint electrodes 212 may have a relatively large width between the common electrodes 302. The fingerprint electrodes 212 may have a relatively small width at a portion intersecting the common electrodes 302. For example, the fingerprint electrodes 212 may have a diamond shape between the common electrodes 302. Accordingly, the fingerprint electrodes 212 may have a low resistance.

The common electrodes 302 may extend in the first direction DR1 intersecting the second direction DR2. The common electrodes 302 may cross the touch area R1 and the fingerprint area R2. As compared to the common electrodes 300 described above with reference to FIG. 1, a width of each of the common electrodes 302 may not be uniform. The common electrodes 302 may have a relatively large width between the touch electrodes 112, between the fingerprint electrodes 212, and between the touch electrodes 112 and the fingerprint electrodes 212 adjacent to each other. The common electrodes 302 may have a relatively small width at a portion where the touch electrodes 112 intersect the fingerprint electrodes 212. For example, the common electrodes 302 may have a diamond shape between the touch electrodes 112, between the fingerprint electrodes 212, and between the touch electrodes 112 and the fingerprint electrodes 212 adjacent to each other. Accordingly, the common electrodes 302 may have a low resistance.

The present disclosure may provide a low capacitance between the common electrodes 302 and the touch electrodes 112, and may provide a high capacitance between the common electrodes 302 and the fingerprint electrodes 212. Accordingly, a touch recognition operation speed and a fingerprint recognition performance of the touch-fingerprint complex sensor 12 may be improved, and the touch electrodes 112 may have a low resistance.

Figure 10:
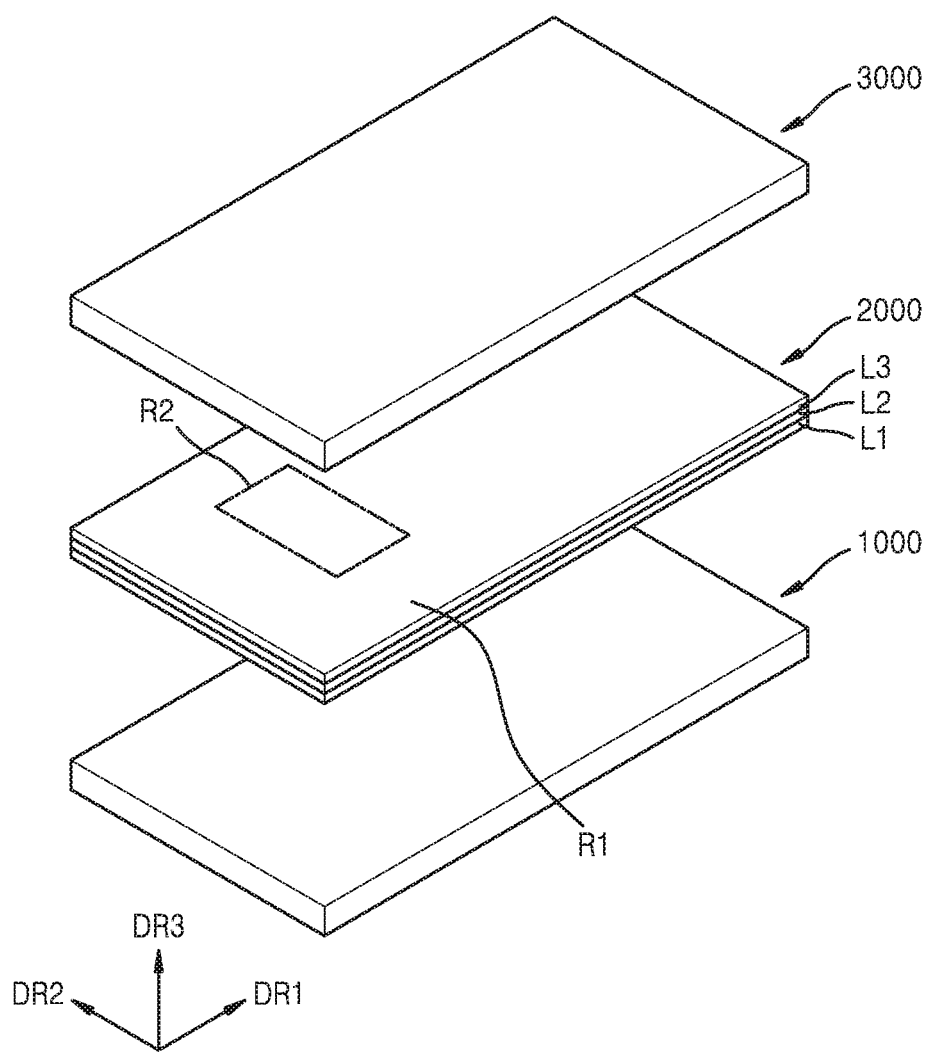
FIG. 10 is an exploded perspective view illustrating an electronic device including a touch-fingerprint complex sensor according to an embodiment.

FIG. 10 is an exploded perspective view illustrating an electronic device including a touch-fingerprint complex sensor 2000 according to an example embodiment. For brevity of explanation, content that is substantially the same as described above with reference to FIGS. 1, 2A, and 2B may be omitted.

Referring to FIG. 10, a display panel 1000 may be provided. For example, the display panel 1000 may include a liquid crystal display (LCD) panel or an organic light emitting diode (OLED) panel. However, the display panel 1000 is not limited to the above disclosure and may be variously changed.

The touch-fingerprint complex sensor 2000 may be provided above the display panel 1000. The touch-fingerprint complex sensor 2000 may be substantially the same as the touch-fingerprint complex sensor 2000 described above with reference to FIGS. 1, 2A, and 2B. The touch-fingerprint complex sensor 2000 may include a first layer L1, a second layer L2, and a third layer L3. The first layer L1 may include the touch substrate 100, the touch electrodes 110, and the touch insulating layer 120 described above with reference to FIGS. 1, 2A, and 2B. The second layer L2 may include the fingerprint substrate 200, the fingerprint electrodes 210, and the fingerprint insulating layer 220 described above with reference to FIGS. 1, 2A, and 2B. The third layer L3 may include the common electrodes 300 and the passivation film 310 described above with reference to FIGS. 1, 2A, and 2B. Touch wirings (not shown), fingerprint wirings (not shown), and common wirings (not shown) may respectively extend from the first through third layers L1, L2, and L3. The touch wirings, the fingerprint wirings, and the common wirings may respectively be electrically connected to the touch electrodes 110, the fingerprint electrodes 210, and the common electrodes 300. Since the touch wirings, the fingerprint wirings, and the common wirings may be arranged in different layers, a position of the touch wirings, a position of the fingerprint wirings, and a position of the common wirings may be independent of each other. For example, the touch wirings and the fingerprint wirings may extend in the second direction DR2, and the common wirings may extend in the first direction DR1. The touch wirings and the fingerprint wirings may overlap each other in the third direction DR3. When the touch wirings and the fingerprint wirings are substantially provided in a same layer, a position of the touch wirings and a position of the fingerprint wirings may be dependent on each other. In other words, the fingerprint wirings may be provided in an area where the touch wirings are not arranged. The present disclosure provides an electronic device with a high degree of freedom in the positions of wirings. The touch wirings, the fingerprint wirings, and the common wirings may be connected to a circuit portion (not shown). The circuit portion may include a detection circuit and a correction circuit or the like. The detection circuit may detect an intersection where a mutual capacitance among intersections of electrodes is changed. The correction circuit may correct a measured amount of change of the mutual capacitance to a particular level. Accordingly, an accuracy of touch recognition and fingerprint recognition may be improved.

A transparent film 3000 may be provided on the touch-fingerprint complex sensor 2000. The transparent film 3000 may cover the touch-fingerprint complex sensor 2000. The transparent film 3000 may include a transparent insulating material. For example, the transparent film 3000 may include glass.

The touch-fingerprint complex sensors 10, 11, 12, and 2000 of the present disclosure may be applied to an electronic device including a touch display. The touch-fingerprint complex sensors 10, 11, 12, and 2000 may be a device of an on-screen capacitive method and may be applied to a fingerprint recognizable touch screen apparatus. The touch-fingerprint complex sensors 10, 11, 12, and 2000 may applied to a mobile device (e.g., a smartphone, a tablet PC), a wearable device (e.g., a smart watch), a flexible device, a foldable device, an electronic device providing a personal authentication function through fingerprint recognition (e.g., a mobile device, an access control device, and a financial device), and various electronic devices (e.g., a home appliance, an automated teller machine (ATM), an automatic ticketing machine, and a navigation device).

The present disclosure provides a touch-fingerprint complex sensor with an improved touch recognition operation speed and fingerprint recognition performance.

The present disclosure may provide touch electrodes having a low resistance.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it should be understood by those of ordinary skill in the art that various changes in form and details may be made therein without departing from the spirit and scope as defined by the following claims.

What is claimed is:

1. A touch-fingerprint complex sensor comprising:
a fingerprint substrate provided in a fingerprint area and a touch area;
common electrodes provided above the fingerprint substrate in a direction that is normal to an upper surface of the fingerprint substrate;
fingerprint electrodes provided between the fingerprint substrate and the common electrodes in the direction; and
touch electrodes provided below the common electrodes and the fingerprint substrate in the direction,
wherein a first subset of the common electrodes, and the fingerprint electrodes are provided in the fingerprint area, and
a second subset of the common electrodes, and the touch electrodes are provided in the touch area.

2. The touch-fingerprint complex sensor of claim 1, wherein the fingerprint electrodes and the touch electrodes are non-overlapping in the direction.

3. The touch-fingerprint complex sensor of claim 1, further comprising:
a fingerprint insulating layer provided between the common electrodes and the fingerprint substrate in the direction,
wherein the fingerprint electrodes are provided between the fingerprint insulating layer and the fingerprint substrate in the direction.

4. The touch-fingerprint complex sensor of claim 1, further comprising:
a touch substrate provided below the fingerprint substrate and the touch electrodes in the direction.

5. The touch-fingerprint complex sensor of claim 4, wherein the touch substrate is provided in the touch area and the fingerprint area.

6. The touch-fingerprint complex sensor of claim 4, further comprising:
a touch insulating layer provided between the fingerprint substrate and the touch substrate in the direction,
wherein the touch insulating layer overlaps the fingerprint electrodes in the direction.

7. The touch-fingerprint complex sensor of claim 1, further comprising:
a bonding layer provided between the touch electrodes and the fingerprint substrate in the direction.

8. The touch-fingerprint complex sensor of claim 1, wherein the common electrodes extend in a first direction parallel to the upper surface of the fingerprint substrate, and
the fingerprint electrodes and the touch electrodes extend in a second direction intersecting the first direction.

9. A method of fabricating a touch-fingerprint complex sensor, the method comprising:
forming an upper layer by forming common electrodes on a fingerprint substrate, and by forming fingerprint electrodes between the common electrodes and the fingerprint substrate;

forming a lower layer that comprises touch electrodes; and bonding the upper layer with the lower layer.

10. The method of claim 9, wherein the forming of the upper layer further comprises forming an insulating layer between the common electrodes and the fingerprint substrate, and wherein the fingerprint electrodes are disposed between the insulating layer and the fingerprint substrate.

11. The method of claim 10, wherein the forming of the insulating layer further comprises coating the fingerprint substrate with an insulating material to cover the fingerprint electrodes.

12. The method of claim 10, wherein the forming of the common electrodes comprises:

forming a first metal layer on the insulating layer; and patterning the first metal layer to expose an upper surface of the insulating layer.

13. The method of claim 9, wherein the lower layer further comprises a touch substrate, and wherein the touch electrodes are formed on the touch substrate.

14. The method of claim 13, wherein the forming of the touch electrodes comprises:

forming a second metal layer on the touch substrate; and patterning the second metal layer to expose an upper surface of the touch substrate.

15. The method of claim 9, wherein the bonding of the upper layer with the lower layer comprises:

bringing an upper surface of the lower layer into contact with a bottom surface of the upper layer; and heat-treating the lower layer and the upper layer.

16. The method of claim 9, wherein the bonding of the upper layer with the lower layer comprises:

forming a bonding layer between the lower layer and the upper layer; and hardening the bonding layer.

17. A touch-fingerprint complex sensor comprising:

a substrate;

touch electrodes provided on the substrate;

fingerprint electrodes provided on the touch electrodes;

common electrodes provided on the fingerprint electrodes;

a spacer provided between the touch electrodes and the fingerprint electrodes; and a fingerprint insulating layer provided between the spacer and the common electrodes, wherein the fingerprint electrodes are disposed between the fingerprint insulating layer and the spacer.

18. The touch-fingerprint complex sensor of claim 17, wherein the fingerprint electrodes and the touch electrodes are non-overlapping in a direction that is normal to an upper surface of the substrate.

19. The touch-fingerprint complex sensor of claim 17, wherein a first distance between the touch electrodes and the common electrodes is greater than a second distance between the fingerprint electrodes and the common electrodes, and wherein a difference between the first distance and the second distance corresponds to a thickness of the spacer.

20. The touch-fingerprint complex sensor of claim 17, further comprising:

a touch insulating layer provided between the substrate and the spacer, wherein the touch insulating layer overlaps the fingerprint electrodes in a direction that is normal to an upper surface of the substrate.

21. A touch-fingerprint complex sensor comprising:

a first layer that includes touch electrodes;

a second layer that includes fingerprint electrodes, and that is disposed above the first layer in a direction that is normal to an upper surface of the first layer; and a third layer that includes common electrodes, and that is disposed above the second layer in the direction that is normal to the upper surface of the first layer.

22. The touch-fingerprint complex sensor of claim 21, wherein the touch electrodes and the fingerprint electrodes are non-overlapping in the direction that is normal to the upper surface of the first layer.

23. The touch-fingerprint complex sensor of claim 21, wherein the touch-fingerprint complex sensor includes a touch area and a fingerprint area, wherein the common electrodes are disposed in the touch area and the fingerprint area, wherein the touch electrodes are disposed in the touch area, and are not disposed in the fingerprint area, and wherein the fingerprint electrodes are disposed in the fingerprint area, and are not disposed in the touch area.

* * * * *